United States Patent [19]

Beardmore

[11] Patent Number: 5,076,362

[45] Date of Patent: Dec. 31, 1991

[54] SUBTERRANEAN FORMATION PERMEABILITY CONTRAST CORRECTION METHODS

[75] Inventor: David H. Beardmore, Bartlesville, Okla.

[73] Assignee: Phillips Petroleum Company, Bartlesville, Okla.

[21] Appl. No.: 668,100

[22] Filed: Mar. 12, 1991

[51] Int. Cl.$^5$ .................... E21B 33/138; E21B 43/20; E21B 43/22

[52] U.S. Cl. .................... 166/269; 166/270; 166/295

[58] Field of Search ............... 166/269, 270, 285, 292, 166/293, 294, 295, 300

[56] References Cited

U.S. PATENT DOCUMENTS

| | | | |
|---|---|---|---|
| 3,013,607 | 12/1961 | Bond et al. | 166/270 X |
| 3,522,844 | 8/1970 | Abdo | 166/270 |
| 3,656,550 | 4/1972 | Wagner, Jr. et al. | 166/270 |
| 3,749,172 | 7/1973 | Hessert et al. | 166/274 |
| 3,762,476 | 10/1973 | Gall | 166/294 |
| 4,120,361 | 10/1978 | Threlkeld et al. | 166/294 |
| 4,494,606 | 1/1985 | Sydansk | 166/295 |
| 4,552,217 | 11/1985 | Wu et al. | 166/270 |
| 4,665,986 | 5/1987 | Sandiford | 166/300 X |
| 4,683,949 | 8/1987 | Sydansk et al. | 166/270 |
| 4,722,397 | 2/1988 | Sydansk | 166/300 X |
| 4,724,906 | 2/1988 | Sydansk | 166/300 X |
| 4,838,352 | 6/1989 | Oberste-Padtberg et al. | 166/295 X |
| 4,917,186 | 4/1990 | Mumallah | 166/295 |
| 5,018,578 | 5/1991 | Rabaa et al. | 166/269 X |

*Primary Examiner*—George A. Suchfield
*Attorney, Agent, or Firm*—Laney, Dougherty, Hessin & Beavers

[57] ABSTRACT

Improved methods of correcting the vertical permeability contrast of a subterranean formation to improve the sweep efficiency of waterflooding operations carried out therein wherein the subterranean formation contains at least one high permeability zone lying adjacent and in fluid communication with at least one low permeability zone are provided. In accordance with the methods, a near well bore portion of the high permeability zone is plugged and a crosslinked gel is formed at least at the boundary between the low permeability zone and the high permeability zone whereby fluid communication between the zones is reduced.

20 Claims, No Drawings

SUBTERRANEAN FORMATION PERMEABILITY CONTRAST CORRECTION METHODS

BACKGROUND OF THE INVENTION

1. Field of the Invention

The present invention relates generally to subterranean formation permeability contrast correction methods, and more particularly, to methods for forming in situ gels in water flooded subterranean formations to plug high permeability zones therein.

2. Description of the Prior Art

In water flooding operations, injected flood water flows from one or more injection wells through the subterranean formation being flooded to one or more production wells. The flood water flows through zones of high permeability to the producing well bores whereby oil in such high permeability zones is recovered. Because the high permeability zones take most of the injected flood water, low permeability zones and the oil contained therein are generally bypassed. While this is acceptable initially when the oil contained in the high permeability zones is being swept therefrom, it is subsequently undesirable as the oil in the high permeability zones becomes depleted. From that point on, the water flood provides little benefit in enhancing oil production.

Methods and compositions for accomplishing near well bore and in depth plugging of high permeability zones in subterranean formations by forming gels therein have heretofore been developed and used. The formation of the gel in high permeability zones causes the zones to be plugged or at least lowered in permeability whereby subsequently injected flood water is caused to enter previously bypassed low permeability zones. This in turn causes the flood water to mobilize increased amounts of oil which are recovered from the subterranean formation.

A variety of methods and polymer compositions which gel in situ to reduce the permeability of high permeability zones in subterranean formations have been developed and used heretofore. For example, U.S. Pat. No. 3,762,476 issued on Oct. 2, 1973 discloses a method of reducing recovered water from a subterranean formation wherein aqueous polymer solutions interspaced with aqueous solutions of crosslinking metallic ions are injected into the formation. A variety of polymers can be utilized in conjunction with various multivalent metal cations which cause the polymers to be crosslinked.

U.S. Pat. No. 4,552,217 issued on Nov. 12, 1985 discloses a water permeability correction process to improve the sweep efficiency of water flooding which involves the sequential injection of an aqueous solution of a crosslinking agent, i.e., sequestered polyvalent metal cations and an aqueous solution containing a crosslinkable polymer such as polyacrylamide.

U.S. Pat. No. 4,683,949 issued on Aug. 4, 1987 describes a conformance improvement method using a crosslinkable gel comprised of a polyacrylamide polymer and a chromium III acetate crosslinking agent in an aqueous solvent.

While the above described methods and compositions as well as other methods and compositions have been utilized successfully for improving the sweep efficiency of water flooding, such methods and compositions have generally been unsuccessful in subterranean formations containing high permeability zones lying adjacent low permeability zones wherein fluid communication takes place at the boundaries between the zones. In such subterranean formations, the near well bore and/or in depth plugging of the high permeability zones does not confine flood water to the low permeability zones because of the flood water communication between the high permeability and low permeability zones.

Thus, there is a need for improved permeability contrast correction methods to improve the sweep efficiency of water flooding operations carried out in subterranean formations containing high permeability zones lying adjacent to low permeability zones wherein there is fluid communication between the zones at the boundaries therebetween.

SUMMARY OF THE INVENTION

By the present invention, methods of correcting the permeability contrast in subterranean formations are provided which fulfill the above described need. That is, the methods are effective in correcting the permeability contrast of a subterranean formation containing at least one high permeability zone lying adjacent to at least one low permeability zone wherein there is fluid communication at the boundary between the zones. By the methods of the present invention, the high permeability zone is first isolated from the low permeability zone. A crosslinkable aqueous polymer solution is then injected into the high permeability zone in an amount sufficient to substantially fill the zone therewith, the crosslinkable aqueous polymer solution being capable of plugging the high permeability zone when crosslinked. The low permeability zone is next isolated from the high permeability zone, and an aqueous liquid containing a crosslinking agent is injected into the low permeability zone which upon contact with the aqueous polymer solution causes the aqueous polymer solution to form a crosslinked gel. Finally, the aqueous liquid containing the crosslinking agent is displaced through the low permeability zone so that the crosslinking agent contacts the aqueous polymer solution and forms a crosslinked gel at least at the boundary between the high and low permeability zones whereby fluid communication between the zones is reduced and subsequently injected flood water is substantially confined to the low permeability zone.

It is, therefore, a general object of the present invention to provide improved methods for correcting the permeability contrast in subterranean formations.

It is a further object of the present invention to provide methods of correcting the permeability contrast in subterranean formations containing adjacent high permeability and low permeability zones wherein the zones are in fluid communication with one another at the boundaries therebetween.

Other and further objects, features and advantages of the present invention will be readily apparent to those skilled in the art upon a reading of the description of preferred embodiments which follows.

DESCRIPTION OF PREFERRED EMBODIMENTS

In the usual circumstance where water flooding operations are carried out, flood water is injected into a subterranean formation by way of one or more substantially vertical well bores penetrating the formation. The formation generally is composed of substantially horizontally layered strata of differing permeabilities. Thus, there is a vertical permeability contrast in the formation whereby the well bore penetrates both high permeability and low permeability zones in the formation. One or more production wells are normally drilled into the formation whereby the production well bores are spaced a distance from the water injection well bores. When water is injected into the formation by way of the injecting wells, it flows through the formation to the production wells by way of the high permeability zones.

When there is no substantial fluid communication between the high permeability zones and the low permeability zones in a subterranean formation, the placement of one or more crosslinked gels in the high permeability zones which plug or substantially reduce the permeabilities thereof is effective in causing flood water to be diverted to low permeability zones in the formation whereby oil contained therein is swept therefrom. However, in subterranean formations wherein high and low permeability zones are in fluid communication at the boundaries therebetween, the formation of crosslinked gels in the high permeability zones is generally ineffective. That is, if a near well bore crosslinked gel or cement is applied by way of the injection wells to the high permeability zones, then subsequently injected flood water will enter the low permeability zones at the injection wells. However, when the flood water initially flowing through the low permeability zones flows past the plugged near well bore portions of the high permeability zones, it re-enters the high permeability zones which results in major portions of the low permeability zones remaining unswept by flood water.

By the method of the present invention, the vertical permeability contrast of a subterranean formation penetrated by a well bore is corrected and the fluid communication between the high and low permeability zones therein is reduced or stopped whereby injected flood water is substantially confined to the low permeability zones as it travels between the injection and production well bores. In accordance with the method, the oil depleted high permeability zone or zones of a water flooded subterranean formation are first isolated from the low permeability zone or zones therein. A crosslinkable aqueous polymer solution is injected into the isolated high permeability zone or zones in an amount sufficient to substantially fill the zone or zones therewith, the crosslinkable aqueous polymer solution being capable of plugging the high permeability zone or zones when crosslinked. The low permeability zone or zones containing oil are next isolated from the high permeability zone or zones, and an aqueous liquid containing a crosslinking agent is injected into the low permeability zone or zones which upon contact with the aqueous polymer solution in the high permeability zone or zones causes the solution to form a crosslinked gel. Finally, the aqueous liquid containing the crosslinking agent is displaced through the low permeability zone or zones so that the crosslinking agent contacts the aqueous polymer solution and forms a crosslinked gel at least at the vicinities of the boundaries between the high and low permeability zones whereby fluid communication therebetween is reduced and subsequently injected flood water is substantially confined to the low permeability zone or zones.

Generally, the isolation of the high permeability zone or zones is accomplished by setting one or more conventional packers in the injection well bores in a manner well known to those skilled in the art. After the high permeability zone or zones have been filled with crosslinkable aqueous polymer solution, the low permeability zone or zones can be isolated from the high permeability zone or zones containing the crosslinkable aqueous polymer solution by re-setting the packers utilized to isolate the high permeability zone or zones and/or setting additional packers in the well bores. The isolation of the low permeability zone or zones can be made more permanent by forming a crosslinked gel in the near injection well portions of the high permeability zone or zones or by squeeze cementing the near well portions of the high permeability zone or zones utilizing techniques well known to those skilled in the art. When the technique of forming a crosslinked gel in the high permeability zone or zones is utilized, after filling the high permeability zone or zones with crosslinkable aqueous polymer solution, a limited quantity of additional aqueous polymer solution containing a delayed crosslinking agent can be injected into the high permeability zone or zones. When the aqueous polymer solution is crosslinked by the delayed crosslinking agent, near injection well portions of the high permeability zone or zones are plugged by the resulting crosslinked gel formed therein. Other techniques known to those skilled in the art can also be used to form crosslinked gels in the near injection well portions of the high permeability zones.

The polymer utilized in the crosslinkable aqueous polymer solution can be any of a variety of high molecular weight natural or synthetic organic polymers capable of forming a gel in an aqueous solution and being crosslinked whereby the permeability of a high permeability subterranean formation zone can be plugged thereby. Examples of natural biopolymers which may be used include xanthan gums, cellulose derivatives, polysaccharides and modified polysaccharides. Synthetic organic polymers which may be used are those which contain carboxylate groups.

Preferred polymers are those that are rapidly crosslinked in aqueous solutions by polyvalent metal cations. Generally, the preferred polymers are those which contain a monomer with an amide functional group expressed by the formula:

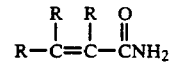

wherein each R is selected from a hydrogen and an alkyl group having from 1 to 3 carbon atoms.

Examples of polymers which include the above described monomer are homopolymers of such monomers and copolymers of such a monomer with an ethylynetically unsaturated monomer from the group consisting of acrylic acid, methacrylic acid, vinylsulfonic acid, vinylbenzylsulfonic acid, vinylacetate, acrylonitrile, methylacrylonitrile, vinylalkylether, vinyl chloride, maleic anhydride, vinyl substituted cationic quaternary ammonium compounds, 2-acrylamido-2-methylpropane sulfonic acid, sodium 2-acrylamido-2-methylpropane sulfonate and vinyl pyrrolidone.

Particularly preferred polymers for use in accordance with the present invention are selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of vinyl pyrrolidone, acrylamide and sodium 2-acrylamido-2-methylpropane sulfonate and copolymers of acrylamide and sodium 2-acrylamido-2-methylpropane sulfonate.

The relative ratios of the monomers are not critical to the practice of this invention. However, specific preferred polymers include a 60:40 weight percent copolymer of vinyl pyrrolidone and acrylamide, a 50:50 weight percent copolymer of vinyl pyrrolidone and acrylamide, a 30:15:55 weight percent terpolymer of vinyl pyrrolidone, acrylamide, and sodium 2-acrylamido-2-methylpropane sulfonate, a 40:60 weight percent copolymer of acrylamide and sodium 2-acrylamido-2-methylpropane sulfonate, and homopolymers of acrylamide wherein not more than about 40 percent of the carboxyamide groups are hydrolyzed.

The molecular weights of the polymers used in accordance with the present invention are not critical. It is preferred, however, that the polymers have molecular weights of between 100,000 and 20,000,000. The upper limit of molecular weight is not important so long as the polymer is water soluble or at least water dispersable and can be pumped into a subterranean formation. The polymers can be present in the aqueous polymer solution in an amount from about 0.01 to about 10% by weight of the solution. When the preferred acrylamide polymers are utilized, they are preferably present in the aqueous solution in an amount of from about 0.02 to about 4 percent by weight of the solution. The concentration of the polymer in the composition depends to some degree upon the molecular weight of the polymer in that higher molecular weight results in higher viscosity of the resulting aqueous gel formed. Any suitable method well known to those skilled in the art can be employed for preparing the crosslinkable aqueous polymer solution utilized in accordance with this invention.

While various crosslinking agents can be used in the aqueous liquid containing a crosslinking agent useful in accordance with this invention, preferred crosslinking agents are polyvalent metal cations. Such polyvalent metal cations are preferably selected from the group of aluminum, zirconium (IV), and the metal cations of the first transition metal series, i.e., scandium, titanium, vanadium, chromium, manganese, iron, cobalt, nickel and copper. The most preferred polyvalent metal cation is chromium (III) cation. The polyvalent metal cation or cations utilized are employed in an aqueous liquid, e.g., fresh water, in the form of salts, e.g., chlorides, or in the form of complexes formed with one or more sequestering agents which retard the reactivity of the cations. That is, sequestering agents such as chelating anions can be utilized which retard the onset and rate of crosslinking of the crosslinkable aqueous polymer solution for a time period sufficient to allow the cations to be transported to the well bore and into the formation without prematurely reacting or otherwise becoming ineffective. Examples of such sequestering agents include anions such as acetate, nitrilotriacetate, tartrate, citrate and phosphate. Chelating agents such as those described in U.S. Pat. Nos. 4,917,186 and 4,552,217 which are incorporated herein by reference can also be used.

In a preferred method of the present invention for correcting the vertical permeability contrast of a subterranean formation penetrated by a well bore to improve the sweep efficiency of water flooding operations carried out therein wherein the formation contains at least one high permeability zone lying adjacent to at least one low permeability zone in fluid communication with one another at the boundary therebetween comprises the steps of: (a) isolating the high permeability zone from the low permeability zone by setting packers in the well bore; (b) injecting a crosslinkable aqueous polymer solution into the high permeability zone in an amount sufficient to substantially fill the zone therewith, the crosslinkable aqueous polymer solution being capable of plugging the high permeability zone when crosslinked; (c) isolating the low permeability zone from the high permeability zone; (d) injecting into the low permeability zone an aqueous liquid containing a crosslinking agent which upon contact with the aqueous polymer solution causes the solution to form a crosslinked gel; and (e) displacing the aqueous liquid containing the crosslinking agent through the low permeability zone so that the crosslinking agent contacts the aqueous polymer solution and forms a crosslinked gel at least at the boundary between the zones whereby fluid communication between the zones is reduced and subsequently injected flood water is substantially confined to the low permeability zone.

As mentioned above, the isolation of the low permeability zone from the high permeability zone after the high permeability zone has been filled with the crosslinkable aqueous polymer solution can be accomplished in various ways. That is, the packers initially set in the well bore to isolate the high permeability zone from the low permeability zone can be re-set and/or additional packers can be set in the well bore to isolate the low permeability zone. Alternately, the near well bore portion of the high permeability zone can be substantially permanently plugged by crosslinking a quantity of the crosslinkable aqueous polymer solution in a near well bore portion of the high permeability zone. This can be accomplished, for example, by introducing an additional quantity of crosslinkable aqueous polymer solution containing a delayed crosslinking agent into the high permeability zone immediately after filling the high permeability zone with crosslinkable aqueous polymer solution in accordance with step (b) above. After the initial delay, the crosslinking of the gel causes the near well bore portion of the high permeability zone to be plugged. A more permanent technique for isolating the low permeability zone is to perform a squeeze cementing procedure in the near well bore portion of the high permeability zone. Generally, the squeeze cementing procedure involves introducing cement into the portion of the high permeability zone adjacent the well bore and causing the cement to set into a hard impermeable mass therein.

In carrying out step (b), a quantity of the crosslinkable aqueous polymer solution is pumped into the high permeability zone which substantially fills such zone with the solution. The term "substantially fill" is used herein to mean that the entire volume of the high permeability zone or zones through which the flood water flows from the injection well or wells to the production well or wells contains crosslinkable gelled aqueous solution.

The injection of the crosslinkable aqueous polymer solution into the high permeability zone in accordance with step (b) has the beneficial effect of displacing additional oil from the high permeability zone. That is, the aqueous polymer solution is generally more viscous than the flood water and as the high permeability zone is filled with the polymer solution, oil remaining in the high permeability zone is swept therefrom.

The quantity of aqueous liquid containing a crosslinking agent injected into the low permeability zone after the high permeability zone has been filled with crosslinkable aqueous polymer solution and the low permeability zone has been isolated from the high permeability zone is such that the liquid containing crosslinking agent can be displaced through the low permeability zone from the injection well or wells to the production well or wells without all of the aqueous liquid containing crosslinking agent being spent or lost as a result of fluid communication between the low permeability and high permeability zones and leak-off to other surrounding permeable strata. The particular quantity can be determined using techniques known to those skilled in the art based on permeability and other information relating to the particular formation being water flooded.

In practice, once the quantity of aqueous liquid containing crosslinking agent is injected into the low permeability zone or zones, it is displaced through the low permeability zone or zones by injecting flood water thereinto. As the injected flood water pushes the aqueous liquid containing crosslinking agent through the low permeability zone or zones and as the aqueous liquid containing crosslinking agent enters the high permeability zone or zones containing crosslinkable polymer solution by way of the boundary or boundaries between the zones, the polymer solution is crosslinked whereby the high permeability zone or zones are plugged at or near the boundary or boundaries therebetween. This in turn causes the injected flood water behind the aqueous liquid containing crosslinking agent to be substantially confined to within the low permeability zone or zones whereby oil contained therein is swept therefrom and recovered.

Thus, the present invention is well adapted to carry out the objects and attain the ends and advantages mentioned as well as those which are inherent therein. While numerous changes can be made in the methods of the present invention by those skilled in the art, such changes are encompassed within the spirit of this invention as defined by the appended claims.

What is claimed is:

1. A method of correcting the permeability contrast in a subterranean formation penetrated by a well bore to improve the sweep efficiency of waterflooding operations carried out therein, said formation containing at least one high permeability zone lying adjacent to at least one low permeability zone, which zones are in fluid communication with one another at the boundary therebetween comprising:
   (a) isolating said high permeability zone from said low permeability zone;
   (b) injecting a crosslinkable aqueous polymer solution into said high permeability zone in an amount sufficient to substantially fill said zone therewith, said crosslinkable aqueous polymer solution being capable of plugging said high permeability zone when crosslinked;
   (c) isolating said low permeability zone from said high permeability zone;
   (d) injecting into said low permeability zone an aqueous liquid containing a crosslinking agent which upon contact with said aqueous polymer solution causes said solution to form a crosslinked gel; and
   (e) displacing said aqueous liquid containing said crosslinking agent through said low permeability zone so that said crosslinking agent contacts said aqueous polymer solution and forms a crosslinked gel at least at the boundary between said zones whereby fluid communication between said zones is reduced and subsequently injected flood water is substantially confined to said low permeability zone.

2. The method of claim 1 wherein said high permeability zone is isolated in accordance with step (a) by setting one or more packers within said well bore.

3. The method of claim 2 wherein said low permeability zone is isolated in accordance with step (c) by setting one or more packers within said well bore.

4. The method of claim 2 wherein said low permeability zone is isolated in accordance with step (c) by squeeze cementing said high permeability zone.

5. The method of claim 2 wherein said low permeability zone is isolated in accordance with step (c) by injecting a crosslinkable aqueous polymer solution containing a delayed crosslinking agent into said high permeability zone whereby upon said polymer solution being crosslinked by said crosslinking agent, a near well bore portion of said high permeability zone is plugged thereby.

6. The method of claim 1 wherein said crosslinkable aqueous polymer solution is an aqueous solution of a polymer selected from the group consisting of natural biopolymers and synthetic organic polymers.

7. The method of claim 6 wherein said polymer is a synthetic organic polymer containing a monomer with an amide functional group expressed by the formula:

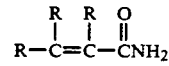

wherein each R is selected from a hydrogen and an alkyl group having from 1 to 3 carbon atoms.

8. The method of claim 7 wherein said crosslinkable aqueous polymer solution is an aqueous solution of a polymer selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of vinyl pyrrolidone, acrylamide and sodium 2-acrylamido-2-methylpropane sulfonate and copolymers of acrylamide and sodium 2-acrylamido-2-methylpropane sulfonate.

9. The method of claim 6 wherein said aqueous liquid containing a crosslinking agent is an aqueous solution of a polyvalent metal cation selected from the group consisting of aluminum, zirconium IV, the metal cations of the first transition metal series, and mixtures of such cations.

10. A method of correcting the vertical permeability contrast of a subterranean formation penetrated by a well bore to improve the sweep efficiency of waterflooding operations carried out therein, said formation containing at least one high permeability zone lying adjacent to at least one low permeability zone, which zones are in fluid communication with one another at the boundary therebetween comprising:
   (a) isolating said high permeability zone from said low permeability zone;
   (b) injecting a crosslinkable aqueous polymer solution into said high permeability zone in an amount sufficient to substantially fill said zone therewith, said crosslinkable aqueous polymer solution being capable of plugging said high permeability zone when crosslinked;

(c) forming a crosslinked gel in a near well bore portion of said high permeability zone to thereby plug said near well bore portion;

(d) injecting into said low permeability zone an aqueous liquid containing a crosslinking agent which upon contact with said aqueous polymer solution causes said solution to form a crosslinked gel;

(e) displacing said aqueous liquid containing said crosslinking agent through said low permeability zone so that said crosslinking agent contacts said aqueous polymer solution and forms a crosslinked gel at least at the boundary between said zones whereby fluid communication between said zones is reduced and subsequently injected flood water is substantially confined to said low permeability zone; and (f) injecting flood water into said low permeability zone.

11. The method of claim 10 wherein said high permeability zone is isolated in accordance with step (a) by setting one or more packers within said well bore.

12. The method of claim 11 wherein said crosslinkable aqueous polymer solution is an aqueous solution of a polymer selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of vinyl pyrrolidone, acrylamide and sodium 2-acrylamido-2-methylpropane sulfonate and copolymers of acrylamide and sodium 2-acrylamido-2-methylpropane sulfonate.

13. The method of claim 12 wherein said aqueous liquid containing a crosslinking agent is an aqueous solution of a polyvalent metal cation selected from the group consisting of aluminum, zirconium IV, the metal cations of the first transition metal series, and mixtures of such cations.

14. The method of claim 13 wherein forming the crosslinked gel of step (c) comprises injecting a crosslinkable aqueous polymer solution containing a delayed crosslinking agent into said near well bore portion of said high permeability zone.

15. The method of claim 13 wherein said polymer is present in said crosslinkable aqueous polymer solution in an amount in the range of from about 0.01% to about 10% by weight of the solution.

16. A method of correcting the vertical permeability contrast of a subterranean formation penetrated by a well bore to improve the sweep efficiency of water-flooding operations carried out therein, said formation containing at least one high permeability zone lying adjacent to at least one low permeability zone, which zones are in fluid communication with one another at the boundary therebetween comprising:

(a) isolating said high permeability zone from said low permeability zone by setting one or more packers in said well bore;

(b) injecting a crosslinkable aqueous polymer solution into said high permeability zone in an amount sufficient to substantially fill said zone therewith, said crosslinkable aqueous polymer solution being capable of plugging said high permeability zone when crosslinked;

(c) injecting a crosslinkable aqueous polymer solution containing a delayed crosslinking agent into said high permeability zone whereby upon said aqueous polymer solution being crosslinked by said crosslinking agent, a near well bore portion of said high permeability zone is plugged thereby;

(d) injecting into said low permeability zone an aqueous liquid containing a crosslinking agent which upon contact with said aqueous polymer solution causes said solution to form a crosslinked gel;

(e) displacing said aqueous liquid containing said crosslinking agent through said low permeability zone by injecting flood water into said low permeability zone so that said crosslinking agent contacts said aqueous polymer solution and forms a crosslinked gel at least at the boundary between said zones whereby fluid communication between said zones is reduced and subsequently injected flood water is substantially confined to said low permeability zone; and (f) continuing to inject flood water into said low permeability zone.

17. The method of claim 16 wherein said crosslinkable aqueous polymer solution is an aqueous solution of a polymer selected from the group consisting of natural biopolymers and synthetic organic polymers.

18. The method of claim 17 wherein said polymer is a synthetic organic polymer containing a monomer with an amide functional group expressed by the formula:

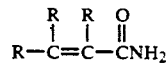

wherein each R is independently hydrogen or an alkyl group having from 1 to 3 carbon atoms.

19. The method of claim 17 wherein said polymer is selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of vinyl pyrrolidone, acrylamide and sodium 2-acrylamido-2-methylpropane sulfonate and copolymers of acrylamide and sodium 2-acrylamido-2-methylpropane sulfonate.

20. The method of claim 19 wherein said aqueous liquid containing a crosslinking agent is an aqueous solution of a polyvalent metal cation selected from the group consisting of aluminum, zirconium IV, the metal cations of the first transition metal series, and mixtures of such cations.

* * * * *